United States Patent [19]

O'Brien et al.

[11] 3,904,956

[45] Sept. 9, 1975

[54] ALTERNATING FORCE MAGNETOMETER

[76] Inventors: Kevin C. O'Brien, 5 Dobson Rd., East Brunswick, N.J. 08816; Robert D. Reasenberg, 16 Garfield St., Lexington, Mass. 02173

[22] Filed: Feb. 26, 1973

[21] Appl. No.: 335,453

[52] U.S. Cl.................. 324/345; 324/13; 324/43 R
[51] Int. Cl............................................ G01r 33/12
[58] Field of Search.......... 324/34 R, 34 S, 13, 14, 324/43 R, 47

[56] References Cited
UNITED STATES PATENTS

| | | | |
|---|---|---|---|
| 2,574,795 | 11/1951 | Miller | 324/14 |
| 3,431,489 | 3/1969 | Bridges et al. | 324/34 R |

OTHER PUBLICATIONS

Zijlstra, H.; A Vibrating Reed Magnetometer for Microscopic Particles; Philips Tech. Rev.; Vol. 31; pp. 40–43; (1970); No. 2.
Lewis, R. T.; A Faraday Type Magnetometer with an Adjustable Field Independent Gradient; Rev. of Scien. Inst.; Vol. 42; No. 1; Jan. 1971; pp. 31–34.
Reeves, R.; An Alternating Force Magnetometer; Jou. of Phys. E. Sci. Inst.; (G.B.); Vol. 5; No. 6; June 1972; (pp. 547–552).

Primary Examiner—Robert J. Corcoran
Attorney, Agent, or Firm—Lerner, David, Littenberg & Samuel

[57] ABSTRACT

A magnetometer is disclosed in which a first coil provides a uniform magnetic field in a measuring region while a second coil provides a field gradient in the same region in the same direction. Each of the coils can be selectively driven by either a D.C. current source or an A.C. signal generator. A sample is suspended in the measuring region while currents are applied to both coils. At least one of the coils has A.C. current applied thereto. The A.C. force on the sample is measured to provide a measurement of magnetic properties of the sample. A magnet mounted for rotation can provide a third field perpendicular to the predetermined direction to affect the sample without interacting with the other two magnetic fields.

4 Claims, 2 Drawing Figures

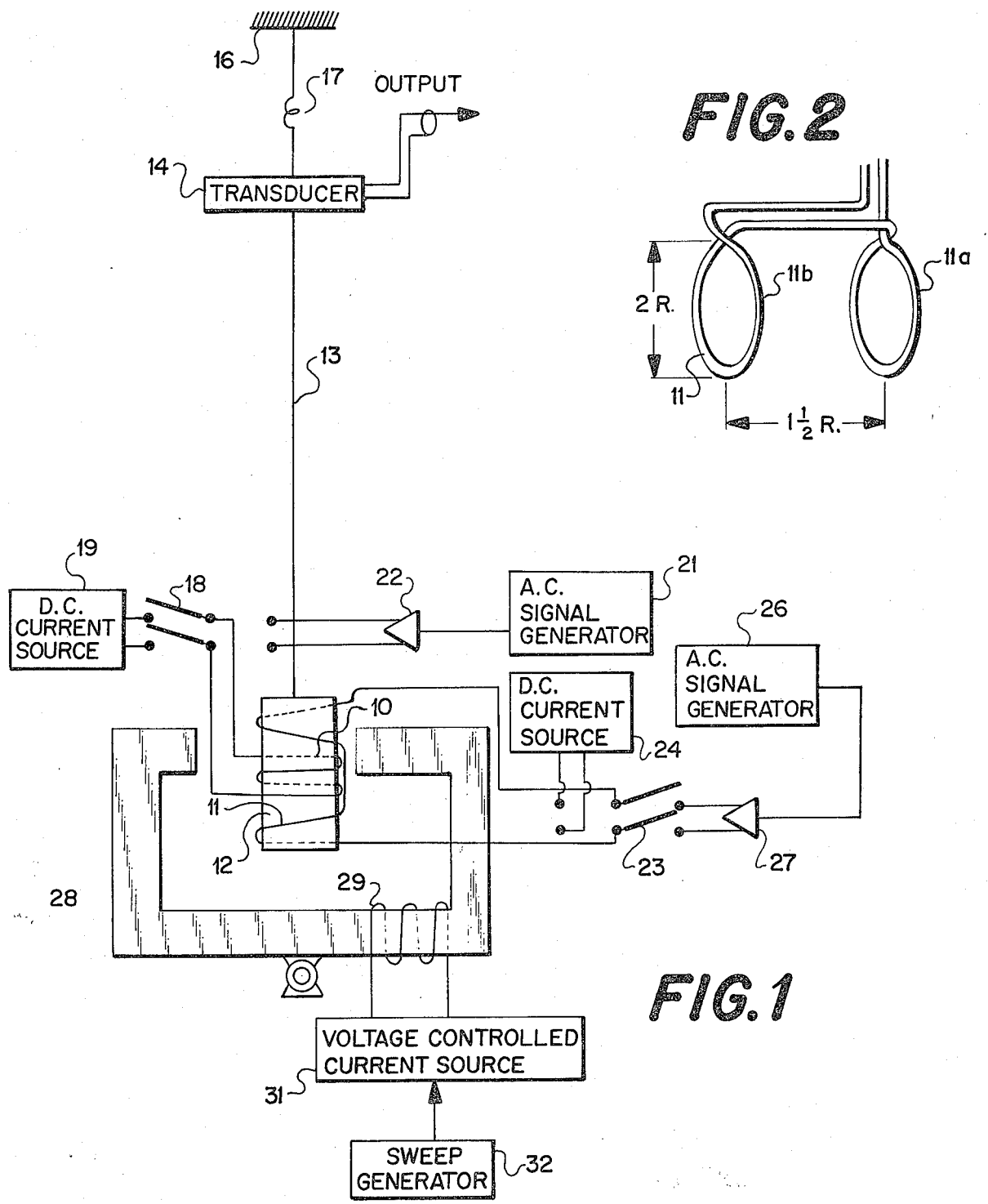

ALTERNATING FORCE MAGNETOMETER

REFERENCE

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates to magnetometers and particularly to magnetometers of the type which employs a nonuniform magnetic field.

BACKGROUND OF THE INVENTION

The measurement of the magnetic properties of matter, such as the susceptibility thereof, has been made by various techniques. For example, the Hall effect is often used as well as the Faraday rotation effect. Microwave resonance and numerous other rarely used phenomena are also employed in checking on the magnetic properties of matter. Other techniques employed in measuring the magnetic properties of matter include the measurement of flux changes sensed in inductive pickup coils and the sensing of forces on magnetic samples as a result of a combination of a magnetic field and a magnetic field gradient.

The devices used for measuring magnetic properties of materials employing the magnetic field and magnetic field gradient include a large number of variations including the most popular known as the Curie method. The Curie method involves placing a sample between the two pole caps of a magnet. The pole caps are tilted with respect to each other or made with a special shape such that the sample region has both a high magnetic field and a high magnetic field gradient. The sample experiences a force due to the applied field and field gradient. Measurements of this force yield a value for the susceptibility of the sample. The Curie method, as well as the others employing the field and the field gradient, suffers from defects which render it difficult to use and totally inapplicable for certain situations.

It has been found that it is quite difficult to maintain a magnetic sample in the region of high magnetic field and high magnetic field gradient because of the fringing fields produced by the pole caps which tend to push the sample toward one or the other of the pole caps. The region of interest is conditionally stable but as soon as the sample drifts towards one of the ends thereof, the fringing field inherent in the Curie device pushes the sample out of the region of interest.

It has further been found that certain magnetic phenomena of interest, particularly in chemical reactions, occur in a few milliseconds so that the use of the Curie method which necessarily employs desensing techniques does not enable the measurement of such magnetic phenomena.

A third drawback of the above-described method resides in the fact that the use of the specially shaped magnets or tilted magnets results in a very small region in which the total magnetic field can be decomposed into the sum of a uniform magnetic field and a uniform magnetic gradient so that the force on the sample is nearly constant. Therefore, the sample under test must be very small so that large samples cannot be measured by this method.

A fourth drawback of the Curie method is that anisotropic and nonlinear properties of materials under test are very difficult to measure by the Curie method.

Therefore, it is an object of this invention to provide a new and improved magnetometer.

It is a further object of this invention to provide a new and improved magnetometer which does not drive a sample under test out of the measuring region.

It is still another object of this invention to provide a new and improved magnetometer which is capable of measuring magnetic changes in short intervals of time.

It is yet another object of this invention to provide a magnetometer which has a relatively large region in which the total magnetic field can be decomposed into the sum of a uniform magnetic field and a uniform magnetic gradient so that the force on the sample is nearly constant.

It is yet a further object of this invention to provide a new and improved magnetometer which is capable of exploring the anisotropic properties of materials under test.

It is yet a further object of this invention to provide a new and improved magnetometer of great sensitivity which enables it to measure the magnetic properties of very weakly magnetic samples.

It is still another object of this invention to provide a new and improved magentometer which is susceptible of being employed to generate magnetic characteristic curves of a sample under test and to measure the rate of change of these curves with applied magnetic field or other parameters easily and accurately.

BRIEF DESCRIPTION OF THE INVENTION

With these and other objects in view, the present invention contemplates a device for measuring the magnetic properties of a specimen of matter including apparatus for defining a measuring region, apparatus for mounting the specimen in the measuring region, apparatus for sensing force variations of the specimen in a predetermined direction in the measuring region, apparatus responsive to a signal applied thereto for generating a magnetic field in the measuring region which is uniform in the predetermined direction, apparatus responsive to a signal applied thereto for generating a magnetic field in the measuring region which is nonuniform in the predetermined direction and apparatus for applying a time varying signal to at least one of the magnetic-field generating apparatuses.

In the preferred embodiment of this invention, an additional field generating apparatus is provided for generating a magnetic field in the measuring region in a direction which may be other than the predetermined direction. The additional field generating means is mounted for movement so that its field direction can be varied by movement thereof.

When making measurements of curves of magnetic properties of a specimen of matter under test, a time varying signal such as a slow sweep is applied to the last described field generating means.

DESCRIPTION OF THE DRAWINGS

For a more complete understanding of the invention, reference should be made to the following detailed description and drawings in which:

FIG. 1 is a schematic diagram of a magnetometer constructed in accordance with the teachings of this invention; and FIG. 2 is a schematic diagram of a gradient generating coil employed in the magnetometer of FIG. 1.

DETAILED DESCRIPTION OF THE INVENTION

Referring now to FIG. 1, we see a schematic diagram, partially in block diagram form, showing a magnetometer constructed in accordance with the teachings of this invention. The magnetometer includes a pair of coils 10 and 11 situated to define a testing or measuring region in which a sample container 12 is suspended by a low-mass string-like member 13. The sample containing member 12 is constructed from a nonmagnetic material and is connected by the member 13 to a force transducer 14. In accordance with this embodiment, the force transducer 14 is connected to a support member 16 by a spring 17 which is a portion of a system for mechanically isolating the vibration-sensitive portion of the magnetometer from the surrounding environment.

The coil 10 is constructed to provide a uniform magnetic field in the region of interest along a direction generally defined by the direction of the member 13. The coil 11 is constructed (as shown in more detail in FIG. 2) to provide a magnetic field gradient over the region of interest, with the component of its field parallel to the field of coil 10 having a gradient generally in the direction of the member 13 parallel to the direction of the field generated by the coil 10. It is of course understood that, as with all field generating devices the coils 10 and 11 produce fields in other directions. These fields result from the physical characteristics of the coils.

Referring now to FIG. 2, we see the coil 11 for producing a high field gradient in more detail. The coil 11 includes two sets of windings 11a 11b, each generally circular in cross section and having a diameter of 2R. The spacing between the two sets of windings 11a and 11b is approximately (3/2) R. It should be noticed that the general thickness of each of the windings 11a and 11b is small compared with the radius R. The windings 11a and 11b are wound in such a direction that the currents flowing in the windings 11a are in the opposite sense of the currents flowing in the windings 11b. The wires connecting the windings 11a and 11b are run parallel to each other so as to cancel out any fields which might be set up by the interconnections thereof. Under this arrangement there is zero field and a high field gradient produced in the region midway between and on the common axis of the two sets of coils 11a and 11b. It should be understood that many other ways can be used which produce the high field gradient. The coil shown in FIG. 2 is merely a specific example of one such device.

Referring again to FIG. 1, we see a double-pole double-throw switch 18 for applying currents to the coil 10. A direct current source 19 is connected to the coil 10 when the double-pole double-throw switch 18 is moved to its left-hand position while a signal generator 21 and an amplifier 22 supply alternating current to the coil 10 when the switch 18 is thrown to its right-hand position. In a like manner, a double-pole double-throw switch 23 applies current from a direct current source 24 to the gradient coil 11 when it is thrown to its left-hand position and an alternating current from a signal generator 26 through an AC amplifier 27 when it is placed in its right-hand position.

In operation, the magnetic properties of a sample are measured by placing the sample in the sample-containing member 12 and applying current to the coils 10 and 11. If direct current were provided to both of the coils, a constant force would be produced on the sample in the sample-containing member 12 which would produce a constant force on the member 13 and therefore on transducer 14. However, in accordance with this invention the transducer 14 provides an output in response to alternating forces. Therefore, in the expected operating mode, at least one of the coils has alternating current therein, and thus an alternating force will be applied to the transducer 14 resulting in an output signal. It should of course be appreciated that variation of either the field or the field gradient in the region of interest will produce the alternating force measurable by the transducer 14.

It is of course possible to provide alternating currents to both of the coils 10 and 11. In most instances, it is desirable to provide alternating currents of different frequencies to the coils 10 and 11 and sense a signal at the output of the transducer 14 which is at a beat frequency of the applied signals. Of course, it is well known that synchronous detection techniques can be employed even when only one alternating signal is employed to insure more precise measurements in a noisy environment.

In accordance with a further aspect of this invention, a large magnet 28 is pivotally mounted with respect to the sample-containing member 12 to add a third field to the measuring region defined by the coils 10 and 11. A coil 29 is wound on the magnet 28 and a voltage (or current) controlled current source 31 drives the coil 29. In this embodiment a sweep generator 32 drives the voltage controlled current source 31. It should of course be understood that the magnet 28 can be a superconducting magnet, a permanent magnet, or any other kind of magnet for generating an intense magnetic field. The magnet 28 is pivotally mounted so that fields in different directions can be applied to the sample-containing member 12 to allow the instrument to sense changes in the properties of the sample in the container 12 as a function of the magnetic field applied thereto. This is quite useful in testing the anisotropic nonlinear properties of material which has heretofore been a very difficult procedure. The ability to test the anisotropic nonlinear properties of materials results from the fact that three fields are now present in the measuring region.

It is well known that the use of the sweep generator 32 can advantageously aid in generating curves of magnetic properties. Therefore, the field can be varied by the sweep generator 32 over an interval while the output of the transducer 14, can be viewed over a similar interval on a chart recorder. In this way, curves of magnetic properties can be viewed directly. Of course one can see that through the use of equipment as disclosed in this application, measurements of the higher-order derivatives of the sample magnetization with respect to applied magnetic field can also be more easily made than heretofore.

The equipment of this invention can also advantageously be employed to measure fields by placing a known sample in the sample container 12 and applying an alternating current to the gradient producing coil 11. The output measured from the transducer 14 would be indicative of the field present in the region. This device can also be used to detect a residual magnetic moment in a sample by applying an alternating gradient to the sample and sensing the output of the transducer 14.

One can determine the magnetic field gradient in a region by using a speciment of known magnetic susceptibility and generating a time-dependent magnetic field in the region by using the coil 10 and measuring the output of the transducer 14.

It is of course clear that the device as disclosed above has many uses in the testing and examination of magnetic materials and that those skilled in the art will develop numerous other ways of using this equipment in light of the disclosure herein.

It should also be appreciated that because we use an alternating field and force transducer, effects of short duration can be measured. Therefore, if there is a transient magnetic effect associated with a chemical (or biological) process, this process can be allowed to take place inside of the container 12 with the fields and gradients applied thereto so that the output of the transducer 14 can be monitored over the intervals of interest. Since alternating currents are used and the transducer 14 has a frequency response sufficient to respond to such time varying signal, the output therefrom can be studied to detect changes in the magnetic properties of the active sample materials during various stages of the process.

It should be understood that while this invention has been described with respect to particular embodiments thereof, numerous others will become obvious to those of ordinary skill in the art in light thereof.

What is claimed is:

1. In a device for measuring magnetic properties of a specimen of matter in a measuring region:

first means for mounting said specimen of matter in said measuring region;

second means for measuring the magnitude of force variations on said specimen of matter in a predetermined direction in said measuring region;

third means responsive to a signal applied thereto for generating a magnetic field in said measuring region which is uniform in said predetermined direction;

fourth means responsive to a signal applied thereto for generating a magnetic field in said measuring region which is nonuniform in said predetermined direction; and fifth means for applying a time varying signal to at least one of said third or fourth means; and sixth means for generating a magnetic field in said measuring region in a direction different than said predetermined direction.

2. In a device as defined in claim 1 in which said sixth means is responsive to signals applied thereto for generating said magnetic field; said device further includes means for generating and applying a varying signal to said sixth means.

3. In a device as defined in claim 1 in which said sixth means is mounted for movement so that said direction different than said predetermined direction can be varied by moving said sixth means.

4. In a device as defined in claim 3 in which said sixth means is responsive to signals applied thereto for generating said magnetic field; said device further includes means for generating and applying a time varying signal to said sixth means.

* * * * *